(12) United States Patent
Yang

(10) Patent No.: US 11,182,996 B2
(45) Date of Patent: Nov. 23, 2021

(54) BELT TYPE BARRICADE AND AUTOMATIC CONTROL SYSTEM CAPABLE OF IMPROVING OPERATION EFFICIENCY OF BELT TYPE BARRICADE

(71) Applicant: LG ELECTRONICS INC., Seoul (KR)

(72) Inventor: Hyunseok Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 160 days.

(21) Appl. No.: 16/621,576

(22) PCT Filed: Jul. 29, 2019

(86) PCT No.: PCT/KR2019/009439
§ 371 (c)(1),
(2) Date: Dec. 11, 2019

(87) PCT Pub. No.: WO2021/020610
PCT Pub. Date: Feb. 4, 2021

(65) Prior Publication Data
US 2021/0287467 A1    Sep. 16, 2021

(51) Int. Cl.
*G07C 9/00* (2020.01)
*G07C 9/10* (2020.01)
*G06F 3/14* (2006.01)

(52) U.S. Cl.
CPC ................. *G07C 9/10* (2020.01); *G06F 3/14* (2013.01)

(58) Field of Classification Search
CPC .................................... G07C 9/10; G06F 3/14
(Continued)

(56) References Cited

U.S. PATENT DOCUMENTS 9,175,450 B2 * 11/2015 Weiner .................. E01F 13/028
9,714,491 B2 *  7/2017 Wettern ................ E01F 13/028
(Continued)

FOREIGN PATENT DOCUMENTS

JP         2003-44684 A      2/2003
KR    10-2016-0034010 A      3/2016
(Continued)

*Primary Examiner* — Ahshik Kim
(74) *Attorney, Agent, or Firm* — Birch, Stewart, Kolasch & Birch, LLP

(57) ABSTRACT

Disclosed are a belt type barricade and an automatic control system capable of improving operation efficiency of the belt type barricade. The barricade includes a belt roll module configured to have an electromagnet belt automatically fastened to or detached from an adjacent barricade, a driving wheel module configured to support autonomous driving and movement by controlling a plurality of driving wheels, and a barricade control module configured to control the fastening and detachment operation of the electromagnet belt of the belt roll module and driving of the driving wheel module based on arrangement structure design information or waiting mode switching information that is received in real time. The barricade autonomously performs a movement for forming a waiting guide line, a movement for automatic charging, belt fastening, awaiter sensing, waiting information indication, and wireless communication functions. Accordingly, the time required and manpower for constructing a waiting line can be reduced.

19 Claims, 9 Drawing Sheets

(58) Field of Classification Search
USPC .......................................................... 235/93
See application file for complete search history.

(56) References Cited

U.S. PATENT DOCUMENTS

| | | | |
|---|---|---|---|
| 9,947,250 B2* | 4/2018 | Yang | G09F 27/005 |
| 2006/0131551 A1* | 6/2006 | Hopp | E01F 13/028 |
| | | | 256/21 |
| 2012/0119907 A1* | 5/2012 | Teuchert | G08B 5/006 |
| | | | 340/541 |
| 2017/0284154 A1* | 10/2017 | Reiner | E06B 3/4636 |
| 2018/0044868 A1* | 2/2018 | Miller | E04H 17/00 |
| 2019/0063018 A1* | 2/2019 | Reiner | B65H 75/4471 |

FOREIGN PATENT DOCUMENTS

| | | |
|---|---|---|
| KR | 20-2017-0000344 U | 1/2017 |
| KR | 10-1754699 B1 | 7/2017 |
| KR | 10-1935575 B1 | 1/2019 |

* cited by examiner

【FIG. 3】
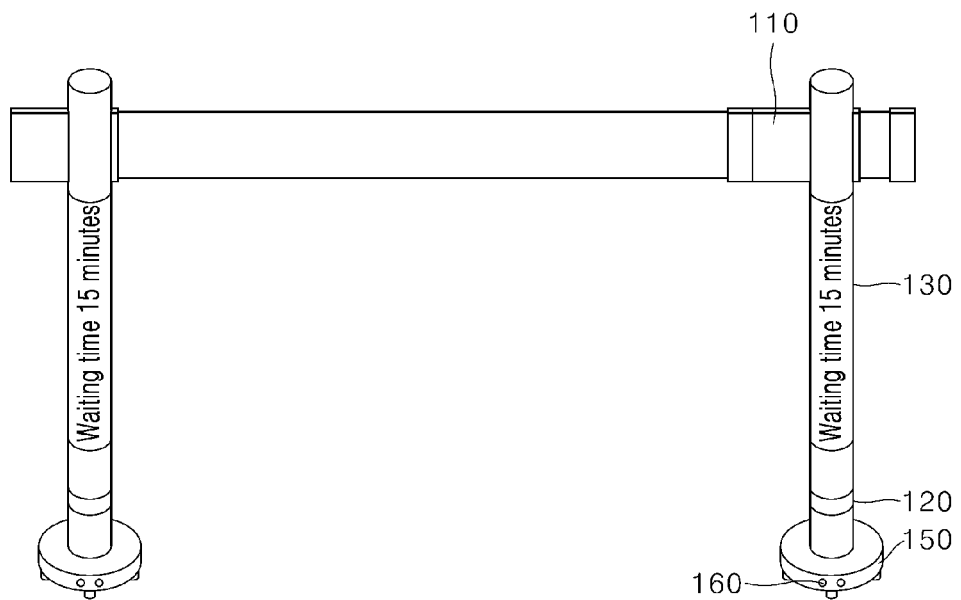

[FIG. 4]
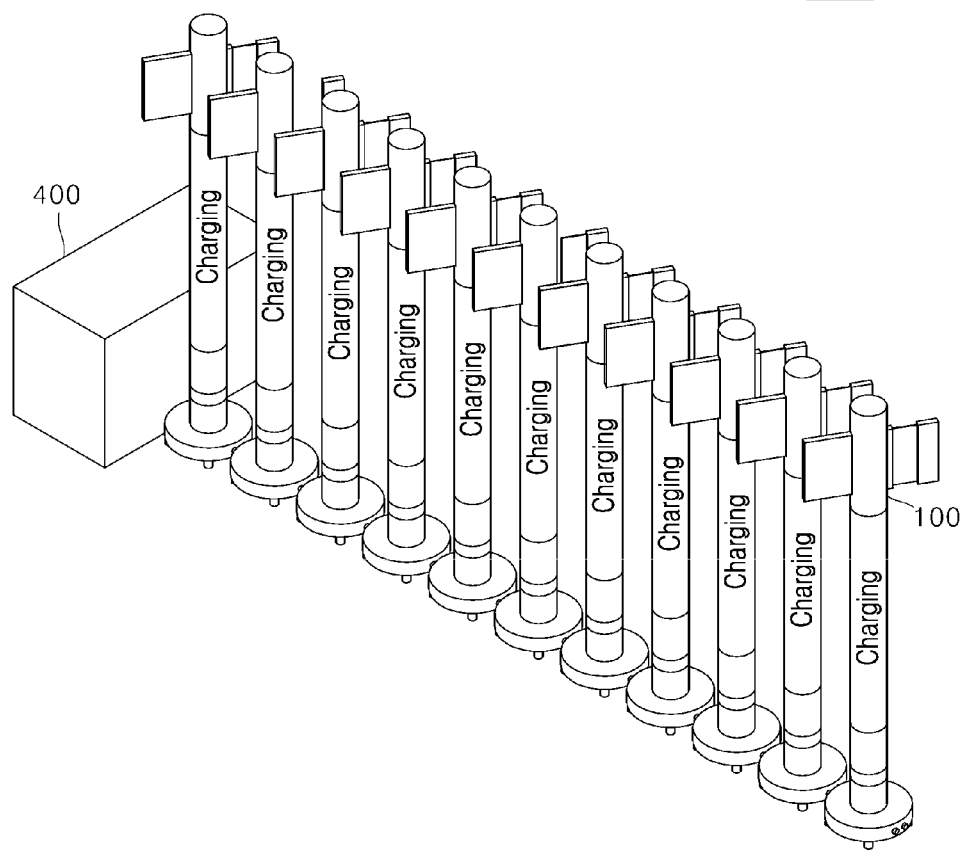

[FIG. 5]
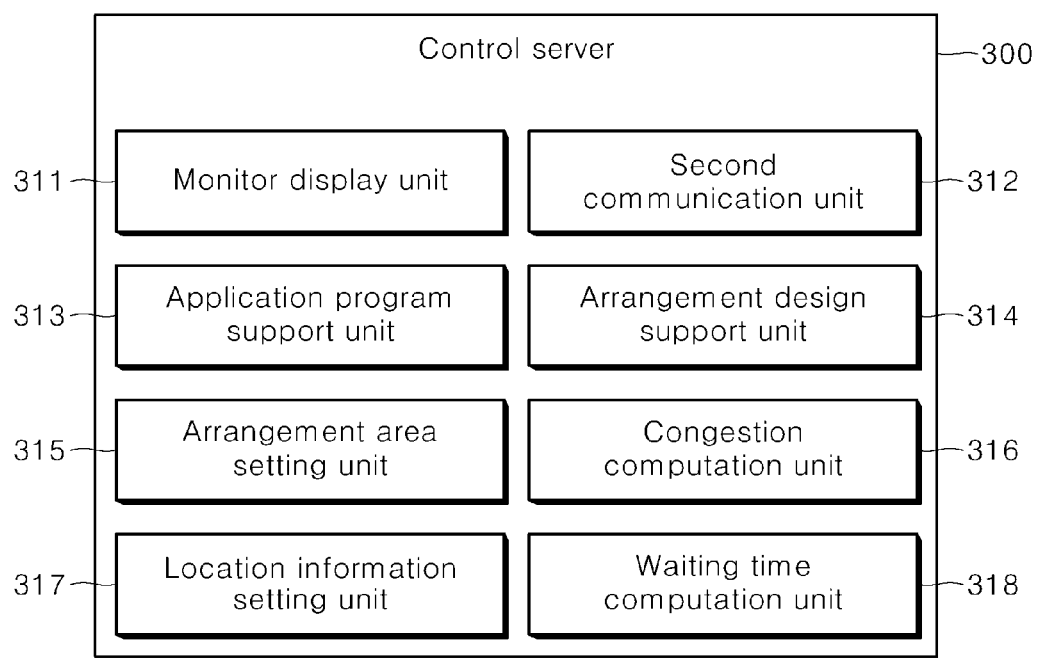

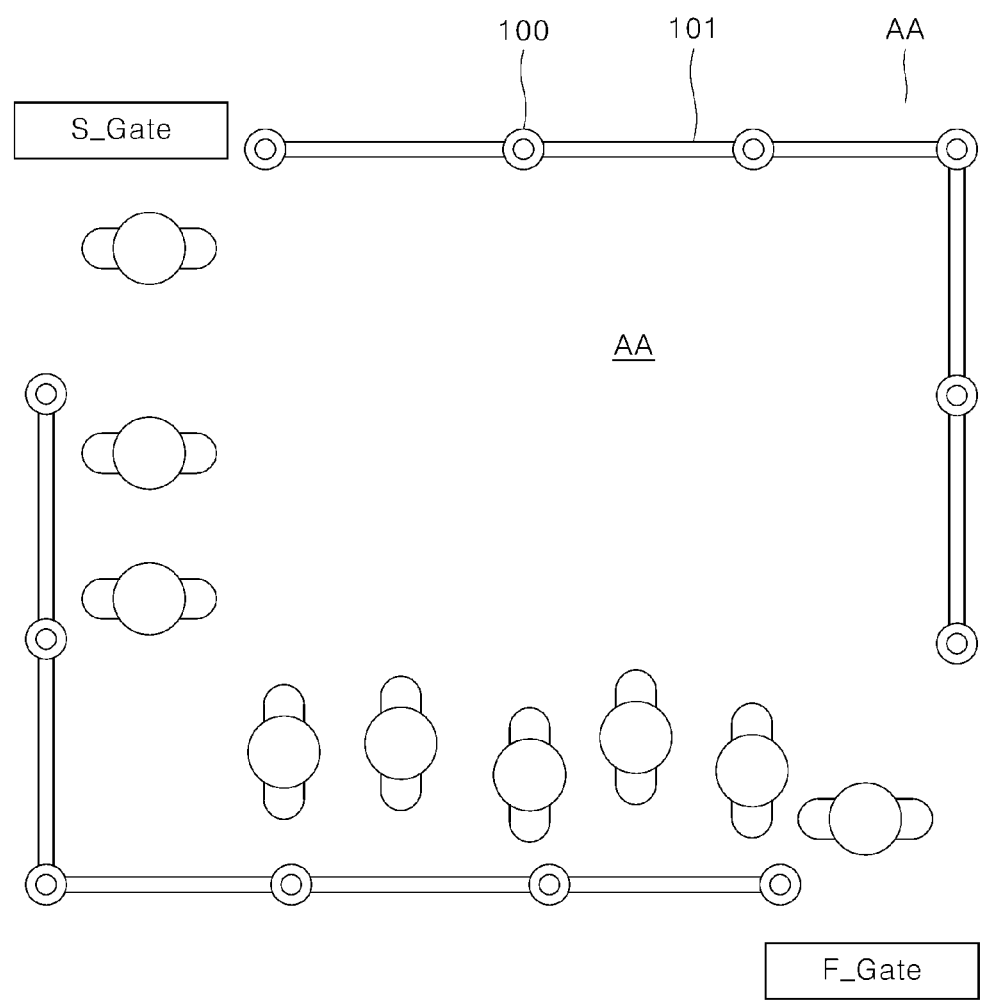
[FIG. 6]

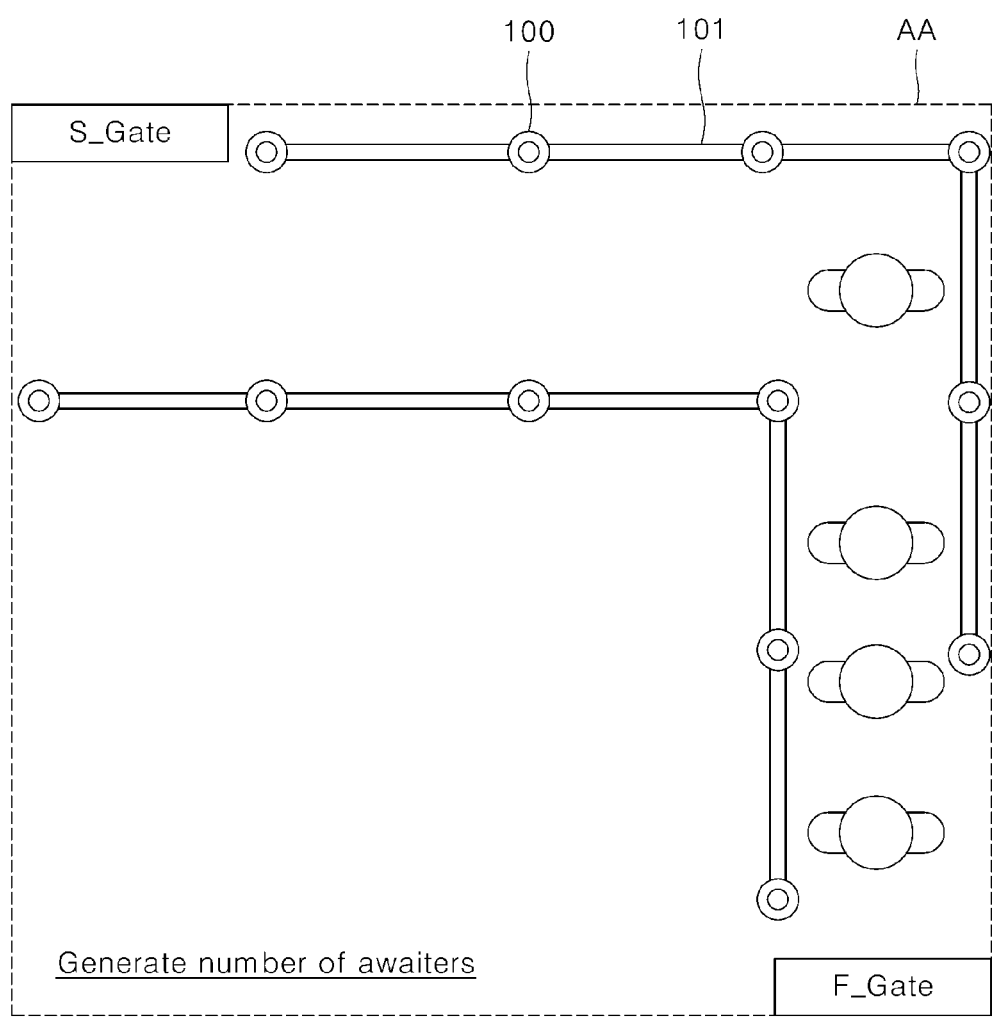
[FIG. 7]

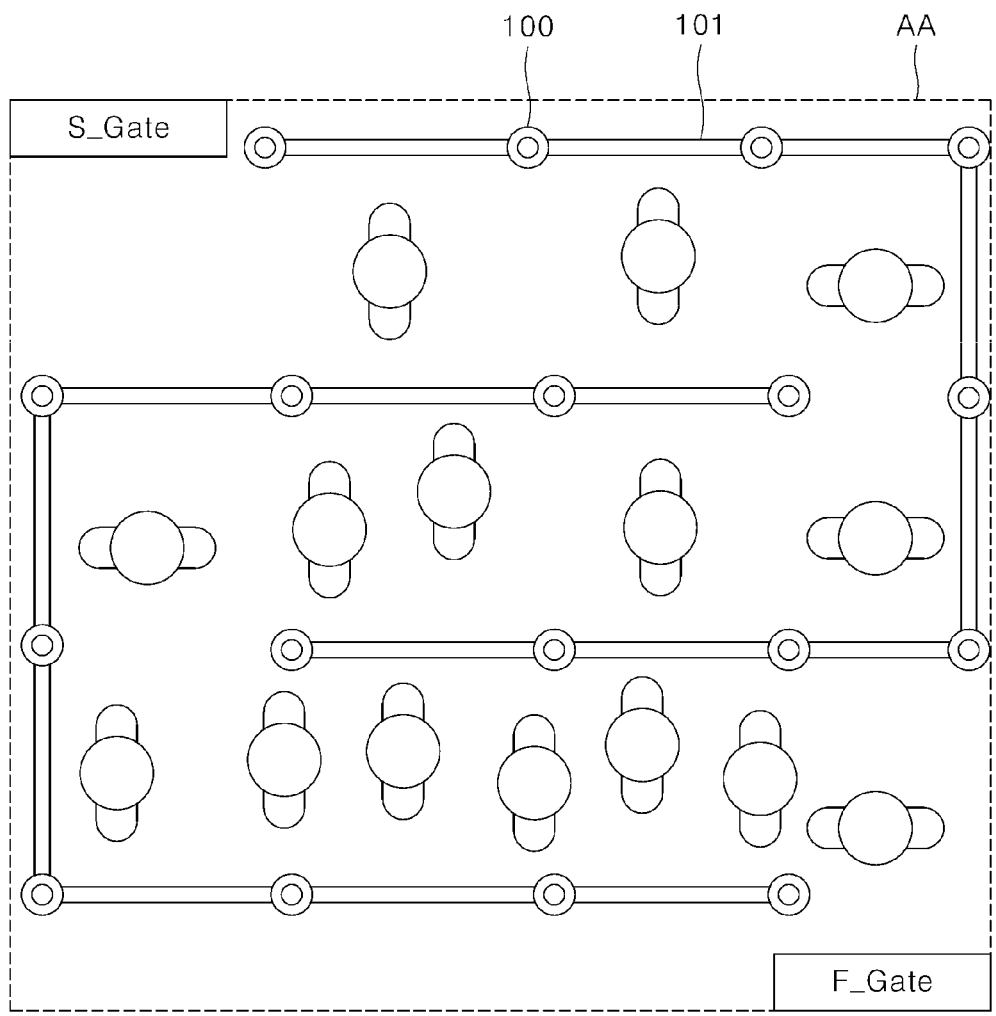
[FIG. 8]

[FIG. 9]
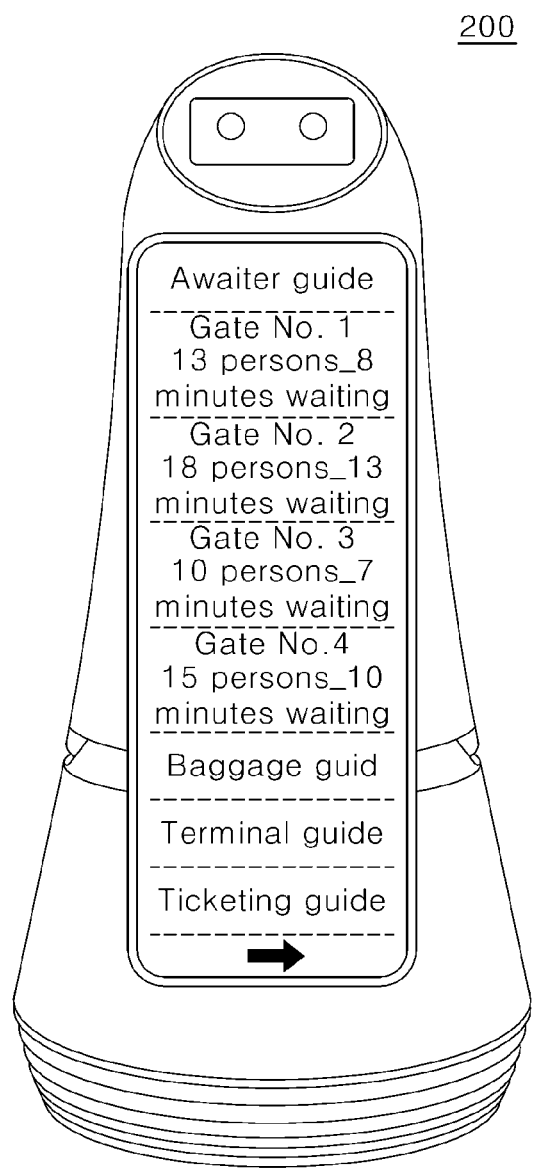

BELT TYPE BARRICADE AND AUTOMATIC CONTROL SYSTEM CAPABLE OF IMPROVING OPERATION EFFICIENCY OF BELT TYPE BARRICADE

CROSS REFERENCE TO RELATED APPLICATIONS

This application is the National Phase of PCT International Application No. PCT/KR2019/009439, filed on Jul. 29, 2019, which is hereby expressly incorporated by reference into the present application.

TECHNICAL FIELD

The present disclosure relates to a belt type barricade and an automatic control system capable of improving operation efficiency of the belt type barricade.

BACKGROUND ART

In general, belt type barricades are positioned in a ticket booth, a guidance desk and an event hall entrance and are chiefly used as a guide line for maintaining the order of people. In a dangerous area, such as a construction site, the belt type barricades are used to control outsiders' access to the site.

The belt type barricade has a drum assembly, including a spiral spring and a belt, embedded in its body so as to draw and use the belt from the drum assembly. Furthermore, when the belt type barricade is disassembled, the belt is wound on the drum assembly and kept in the body by driving that enables the belt to be automatically wound.

In a conventional belt type barricade, a belt rack is formed on the external surface of the body or the drum assembly. A detachable fixing device is attached to or detached from the belt rack of another barricade by drawing the detachable fixing device positioned at the end of the belt.

When barricades according to a conventional technology are used, a guide line may be formed by spacing and disposing the barricades in a boundary area for blocking or guiding a pass and fastening the detachable fixing device of a belt, drawn from each of the barricades, to the rack of another adjacent barricade. Furthermore, a pass for people can be blocked or guided through the formed guide line.

If the conventional belt type barricades are used, however, the person concerned has to set a guide line by predicting and determining visitors in real time, and to construct the guide line by moving barricades necessary to form the set guide line, and connecting the belts of the respective barricades one by one. Accordingly, there are problems in that it is inconvenient to move or dispose multiple barricades and manpower is necessary.

Furthermore, use efficiency of barricades is inevitably low because the time is taken to set a guide line again and additional manpower is necessary whenever a guide line change issue occurs, such as that the guide line has to be set again or changed or a control direction has to be changed depending on a change in the number of visitors.

Furthermore, the elements of the conventional belt type barricade are simply assembled and constructed mechanically. Accordingly, awaiters who are waiting in the guide line of the belt type barricades inevitably feel bored and are dissatisfied because they are controlled mechanically.

DISCLOSURE

Technical Problem

Various embodiments are directed to the provision of a belt type barricade capable of performing functions, such as a movement for forming a waiting guide line, a movement for automatic charging, belt fastening, awaiter sensing, waiting information indication, and wireless communication, and an automatic control system capable of improving operation efficiency of the belt type barricade.

Also, various embodiments are directed to the provision of an automatic control system, which can automatically set or change an awaiter guide line based on a change in the number of visitors or awaiters and a waiting space characteristic and can remotely control barricades based on a set guide line.

Further, various embodiments are directed to the provision of a belt type barricade capable of supporting a visitor or awaiter so that the visitor or awaiter can check waiting time information, congestion information, waiting line change guide information, event information, or life information in real time, and an automatic control system for the belt type barricade.

Objects of the present disclosure are not limited to the above-described objects, and other objects and advantages of the present disclosure not described above may be understood from the following description and evidently understood based on embodiments of the present disclosure. It may also be seen that the objects and advantages of the present disclosure may be realized by means written in the claims and a combination thereof.

Technical Solution

In an embodiment, a belt type barricade includes a belt roll module for enabling a belt fastening operation for forming a waiting guide line to be automatically performed. Accordingly, the electromagnet belt of the belt type barricade can be automatically fastened to or detached from an adjacent barricade.

Particularly, the belt type barricade includes a driving wheel module in order to support autonomous driving and movement for forming a waiting guide line so that autonomous driving and movement can be performed through control of a plurality of driving wheels. To this end, the electromagnet belt fastening and detachment operation of the belt roll module is controlled and the driving of the driving wheel module is controlled based on arrangement structure design information or waiting mode switching information received through a barricade control module in real time.

Furthermore, in an embodiment, an automatic control system for a belt type barricade enables a plurality of belt type barricades to form a waiting guide line by performing autonomous driving, automatic belt fastening, awaiter sensing, waiting information indication, and wireless communication functions or to perform an autonomous driving and moving function for automatic charging.

To this end, a control server divides the plurality of belt type barricades into groups, and controls the automatic belt fastening, autonomous driving, automatic arrangement and automatic charging operation of the belt type barricades of each group so that the barricades form a waiting guide line for each preset area.

Advantageous Effects

The belt type barricade according to an embodiment provides an effect in that it can reduce the time required and manpower for constructing a waiting guide line by autonomously performing functions, such as a movement for forming a waiting guide line, a movement for automatic charging, belt fastening, awaiter sensing, waiting information indication, and wireless communication.

Furthermore, the automatic control system for belt type barricades according to an embodiment can improve management and operation efficiency for belt type barricades by automatically setting or changing an awaiter guide line and remotely controlling the barricade units based on the set guide line.

Furthermore, the automatic control system for belt type barricades according to an embodiment provides an effect in that it can improve use satisfaction and reliability for awaiters and administrators by supporting a visitor or an awaiter so that the visitor or awaiter can check waiting time information, congestion information, waiting line change guide information, event information, or life information in real time.

Effects of the present disclosure are not limited to the above-described effects, and other effects not described above may be evidently understood by those skilled in the art from the following descriptions.

BRIEF DESCRIPTION OF DRAWINGS

FIG. 3 is a diagram illustrating an automatic belt connection configuration for the belt type barricades illustrated in FIGS. 1 and 2.

FIG. 4 is a diagram illustrating an automatic charging arrangement configuration for the belt type barricades illustrated in FIGS. 1 and 2.

FIG. 5 is a detailed block diagram illustrating a control server of FIG. 1.

FIG. 6 is a diagram illustrating the formation of a guide line and arrangement structure for belt type barricades according to an embodiment.

FIG. 7 is a diagram illustrating a guide line change design and change structure for the belt type barricades of FIG. 6.

FIG. 8 is another diagram illustrating a guide line change design and change structure for the belt type barricades of FIG. 6.

FIG. 9 is a diagram illustrating the information notification function of a guide robot based on wireless communication between the control server and the guide robot of FIG. 1.

MODE FOR INVENTION

Figure 1:
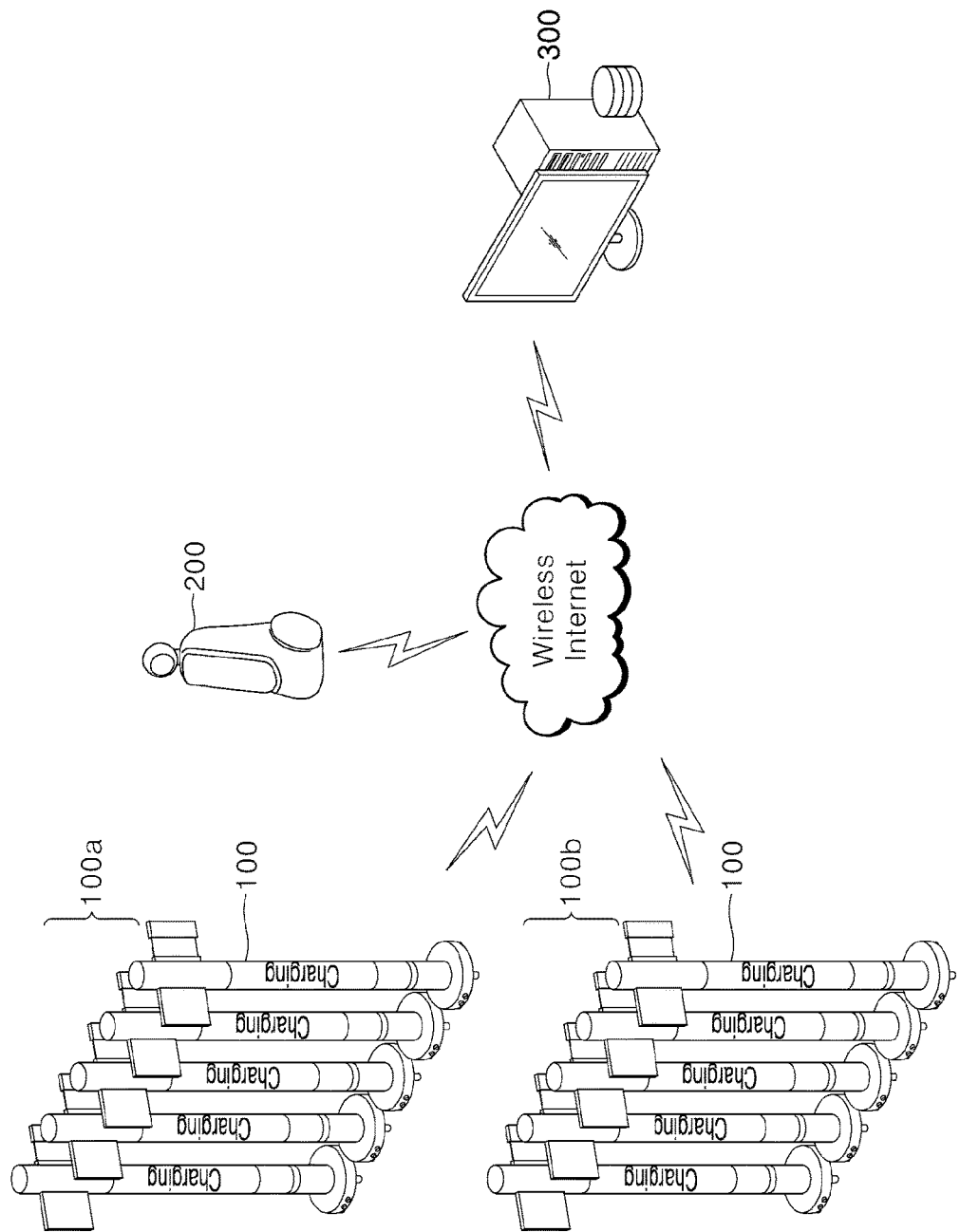
FIG. 1 is a detailed configuration illustrating an automatic control system for belt type barricades according to an embodiment.

The above-described objects, characteristics, and merits are described in detail with reference to the accompanying drawings, and thus a person having ordinary skill in the art to which the present disclosure pertains may readily practice the technical spirit of the present disclosure. Furthermore, in describing the present disclosure, a detailed description of a known art related to the present disclosure will be omitted if it is deemed to make the gist of the present disclosure unnecessarily vague. Hereinafter, embodiments according to the present disclosure are described in detail with reference to the accompanying drawings. In the drawings, the same reference numerals are used to the same or similar elements.

Hereinafter, embodiments of the present disclosure are described in detail with reference to the accompanying drawings.

FIG. 1 is a detailed configuration illustrating an automatic control system for belt type barricades according to an embodiment.

In FIG. 1, the automatic control system for belt type barricades includes a plurality of belt type barricades 100, a control server 300, and a guide robot 200.

The plurality of belt type barricades 100 may be divided into one or more groups 100a and 100b and disposed in each preset area as the group 100a or 100b. The belt type barricades 100 divided into the groups 100a and 100b operate in a waiting guide line forming mode or a waiting mode in each area.

In the waiting guide line forming mode, each of the belt type barricades 100 forms a waiting guide line or divides the boundary of blocking areas by performing an autonomous driving, automatic belt fastening, awaiter sensing, waiting information indication or wireless communication function.

In the waiting mode in which a waiting guide line is not formed, each of the belt type barricades 100 may perform an automatic charging operation in a preset waiting place through the autonomous driving and moving function.

In the waiting mode, the belt type barricades 100 of the groups 100a and 100b perform automatic charging at a charging location in a preset waiting place. When arrangement structure design information is received from the control server 300, the mode of the belt type barricades 100 switch to the waiting guide line forming mode and the belt type barricades 100 perform a waiting guide line forming operation.

Specifically, when the arrangement structure design information is received, the plurality of belt type barricades 100 divided into the groups 100a and 100b performs an electromagnet belt fastening function so that belts are automatically fastened between adjacent belt type barricades 100. Furthermore, in the state in which the belts have been fastened, each of the belt type barricades 100 autonomously travels and moves to a place on its assigned coordinates within a preset area based on the arrangement structure design information, and forms a waiting guide line.

Furthermore, when the arrangement structure design information is changed and received again, each of the belt type barricades 100 may automatically release or fasten belts between the barricades 100 based on the changed arrangement structure design information, and may then autonomously travel and move to a location on changed coordinates, thereby changing the waiting guide line.

In the state in which the waiting guide line has been formed, each of the belt type barricades 100 detects adjacent awaiters and a change in the surrounding condition in real time, and transmits detected information to the control server 300 and a nearby guide robot 200.

When waiting mode switching information is received, the belt type barricades 100 of each of the groups 100a and 100b autonomously travel and move to a charging location on preset coordinates and are disposed in preset order. When the barricades are disposed in the waiting mode, the charging connectors of adjacent barricades 100 are fastened so that an automatic charging operation is performed.

The control server 300 divides the plurality of belt type barricades 100 into groups, and performs short distance/remote wireless communication with the belt type barricades 100 of each of the groups 100a and 100b through wireless Internet.

The control server 300 designs or changes the arrangement structure of the belt type barricades 100 for each of the groups 100*a* and 100*b* so that the belt type barricades form a waiting guide line for each preset area, and controls the autonomous driving, automatic belt fastening, and automatic charging operation of each of the belt type barricades 100.

Specifically, the control server 300 may set initial arrangement structure design information for the initial arrangement of the belt type barricades 100 of each of the groups 100*a* and 100*b* disposed for each preset area, and may control the belt type barricades 100 of each of the groups 100*a* and 100*b* to perform automatic belt fastening and the autonomous driving based on the initial arrangement structure design information.

Thereafter, the control server 300 changes the arrangement structure design information based on awaiter detection information and surrounding condition change information received from each of the barricades 100. Furthermore, the control server 300 may control the belt type barricades 100 of each of the groups 100*a* and 100*b* based on the changed arrangement structure design information so that a belt fastening structure and an arrangement location of the barricades 100 are changed. As described above, the belt fastening structure and arrangement location of the belt type barricades 100 of each of the groups 100*a* and 100*b* may be changed in various ways based on awaiter detection information and surrounding condition change information.

The control server 300 may control the mode of the belt type barricades 100 of each of the groups 100*a* and 100*b* to switch to a waiting mode by transmitting waiting mode switching information to the belt type barricades 100 of each of the groups 100*a* and 100*b*. The waiting mode switching information includes charging location, arrangement sequence and connector binding operation control information of the belt type barricades 100 of each of the groups 100*a* and 100*b*. The belt type barricades 100 of each of the groups 100*a* and 100*b* may autonomously travel based on the waiting mode switching information, and may perform an automatic charging operation.

The guide robot 200 performs short distance/remote wireless communication with the barricades 100 of each of the groups 100*a* and 100*b* and the control server 300 through wireless Internet. The guide robot 200 receives waiting time information or congestion information based on awaiter detection information and surrounding condition change information from the control server 300. Furthermore, the guide robot 200 generates waiting line change guide information based on the waiting time information and the congestion information, and displays the information on an image display panel or outputs it through a speaker. Furthermore, the guide robot 200 may receive guide information, such as event information or life information, from the control server 300 in real time in addition to the waiting line change guide information, and may display or output the guide information in an image form or through a speaker.

Figure 2:
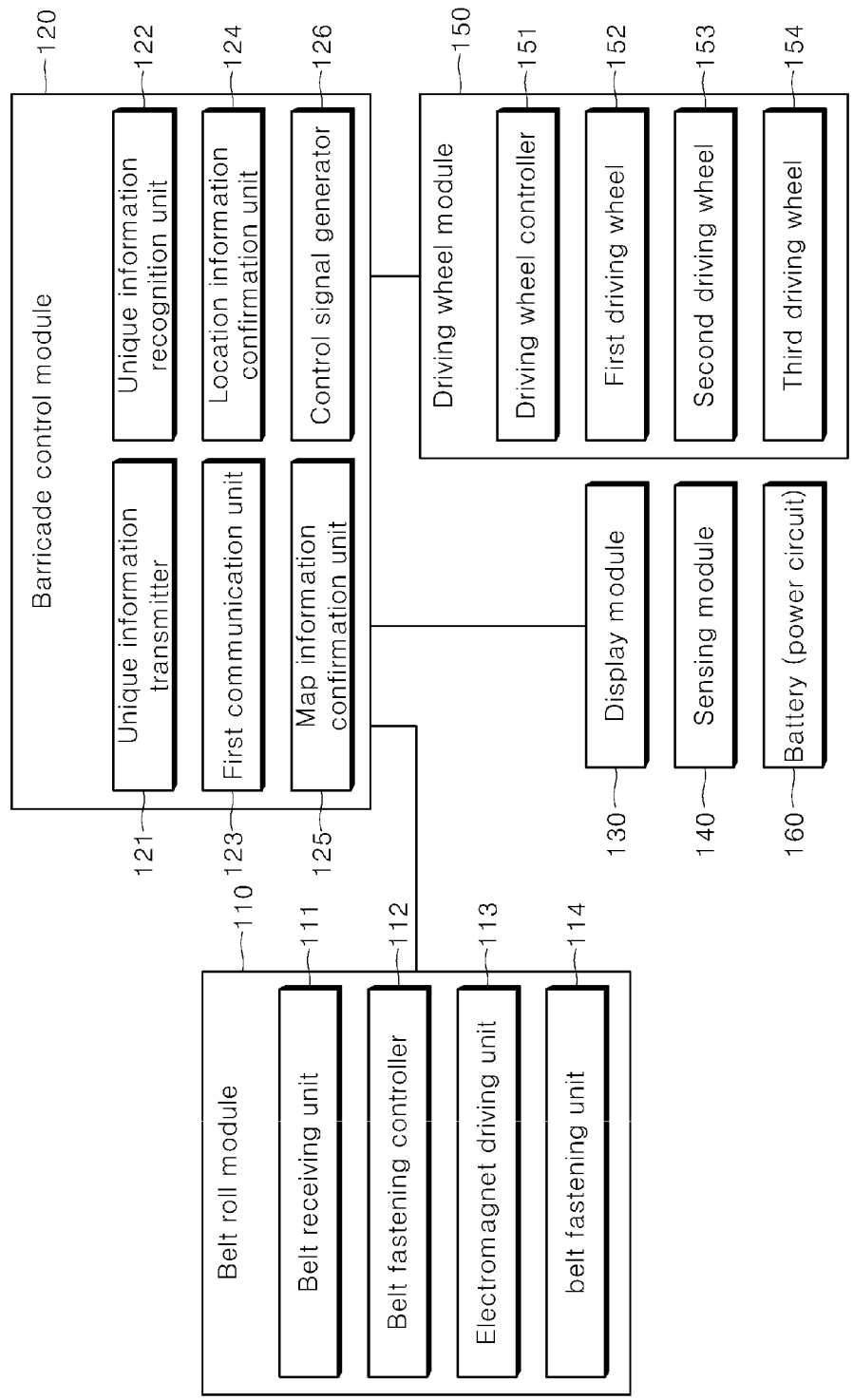
FIG. 2 is a detailed block diagram illustrating the belt type barricade of FIG. 1.

FIG. 2 is a detailed block diagram illustrating the belt type barricade of FIG. 1. Furthermore, FIG. 3 is a diagram illustrating an automatic belt connection configuration for the belt type barricades illustrated in FIGS. 1 and 2.

Referring to FIGS. 2 and 3, each of the belt type barricades 100 includes a belt roll module 110, a barricade control module 120, a display module 130, a sensing module 140, a driving wheel module 150, and a battery (or power circuit) 160.

The belt roll module 110 may be configured on the upper side of the barricade 100, and enables an electromagnet belt, received therein in a rolling type, to be drawn so as to be automatically fastened and attached to the belt roll module 110 of an adjacent barricade 100. To this end, a metallic fastening member is configured at the end on one side of the electromagnet belt drawn to the outside of the belt roll module 110. The metallic fastening member may be attached to or detached from a belt roll module 110 that generates an electromagnetic force in response to an electromagnetic force generated from the belt roll module 110 of an adjacent barricade 100.

The belt roll module 110 includes a belt receiving unit 111 configured to have an electromagnet belt received therein or drawn therefrom in a rolling type and an electromagnet driving unit 113 configured to supply driving power so that the electromagnet of a belt fastening unit 114 generates an electromagnetic force. Furthermore, the belt roll module 110 includes a belt fastening controller 112 configured to control belt fastening or detachment by controlling the driving power on/off operation of the electromagnet driving unit 113.

Referring to FIG. 3, in the state in which a plurality of belt type barricades 100 has been disposed adjacently, when the electromagnet of the belt fastening unit 114 of one barricade 100 generates an electromagnetic force, the metallic fastening member at the end of the electromagnet belt of the other barricade 100 is attached to the electromagnet of the one barricade 100 that has generated the electromagnetic force. Furthermore, if each of the barricades 100 moves in the state in which the electromagnetic force remains intact, the electromagnet belt is drawn from the belt receiving unit 111 and a guide line is formed between the two barricades 100.

For the autonomous driving and movement of the belt type barricade 100, the driving wheel module 150 of the belt type barricade 100 includes a plurality of driving wheels 152, 153, and 154 and a driving wheel controller 151 for controlling the driving of the driving wheels 152, 153, and 154.

Each of the driving wheels 152, 153, and 154 includes at least one electric motor and a wheel rotated by electric power received from the motor. The main body of the barricade 100 is mounted on the driving wheels 152, 153, and 154. The driving wheels are configured at the bottom of the main body of the barricade 100. The driving wheels 152, 153, and 154 support the movement and autonomous driving of the barricade 100 through power control of the driving wheel controller 151.

The barricade control module 120 controls the electromagnet belt fastening and detachment operation of the belt roll module 110 and the driving of the driving wheel module 150 based on arrangement structure design information or waiting mode switching information received from the control server 300 in real time. To this end, the barricade control module 120 is configured to include a unique information transmitter 121, a unique information recognition unit 122, a first communication unit 123, a location information confirmation unit 124, a map information confirmation unit 125, and a control signal generator 126.

The unique information transmitter 121 of the barricade control module 120 reads unique information including its own ID and serial number stored in the unique information recognition unit 122 and supports the transmission of unique information when current location information including current location coordinates is transmitted.

The first communication unit 123 transmits current location information to the control server 300 along with unique information, and transmits arrangement structure design information, received from the control server 300, to the map information confirmation unit 125 and the control signal generator 126.

Particularly, the location information confirmation unit 124 of the barricade control module 120 computes location information including location coordinates in real time. In this case, the location information confirmation unit 124 computes current location coordinates in real time using a GPS module, an acceleration sensor, a gyro sensor, etc. Furthermore, the location information confirmation unit 124 generates and updates current location information in real time by matching the computed current location coordinates with the map structure of a preset area.

The map information confirmation unit 125 generates map structure information by comparing current location coordinates with arrangement location coordinates included in arrangement structure design information received from the control server 300 through the first communication unit 123. Specifically, when arrangement structure design information is received or received again from the control server 300, the map information confirmation unit 125 extracts arrangement location coordinates for each of pieces of unique information included in the arrangement structure design information, and computes arrangement location coordinates coincident with its own unique information. Furthermore, the map information confirmation unit 125 updates map information by matching its own current location coordinates with arrangement location coordinates coincident with its own unique information on the map information.

The control signal generator 126 sets a moving path based on a result of a comparison between current location coordinates and arrangement location coordinates included in arrangement structure design information, and controls the driving wheel module 150 and the belt roll module 110. Specifically, the control signal generator 126 receives and confirms map information having matched location coordinates through the map information confirmation unit 125 in real time, confirms the received map information, and compares its own current location coordinates with arrangement location coordinates included in arrangement structure design information. Furthermore, the control signal generator 126 sets release/fastening location information and moving path information for the electromagnet belt based on a result of the comparison between the location coordinates.

The control signal generator 126 generates a steering control signal and speed control signal for each of the driving wheels 152, 153, and 154 so that a corresponding belt type barricade can move and autonomously travel by the driving of the plurality of driving wheels 152, 153, and 154 of the driving wheel module 150. In this case, the control signal generator 126 generates the steering control signal and speed control signal for each of the driving wheels 152, 153, and 154 so that the main body of the barricade 100 mounted on the plurality of driving wheels 152, 153, and 154 can move based on the release/fastening location of the electromagnet belt and moving path information.

When waiting mode switching information from the control server 300 is input to the map information confirmation unit 125 and the control signal generator 126 through the first communication unit 123, the map information confirmation unit 125 updates map information by matching its own current location coordinates with preset waiting and charging location coordinates included in the map information.

The control signal generator 126 compares its own current location coordinates with mapped waiting and charging location coordinates included in map information, and sets moving path information for a waiting and charging location based on a result of the comparison of the location coordinates. Furthermore, the control signal generator 126 generates a steering control signal and speed control signal for each of the driving wheels 152, 153, and 154 so that the main body of the barricade 100 mounted on the plurality of driving wheels 152, 153, and 154 can move along the moving path to a waiting and charging location.

FIG. 4 is a diagram illustrating an automatic charging arrangement configuration for the belt type barricades illustrated in FIGS. 1 and 2.

As illustrated in FIG. 4, the control signal generator 126 generates a steering control signal and speed control signal for each of the plurality of driving wheels 152, 153, and 154 so that the main body of the barricade 100 mounted on the driving wheels 152, 153, and 154 autonomously travels and moves to a charging location having preset coordinates and thus the barricades 100 are disposed in preset order. When the barricades 100 are disposed in the waiting mode, the charging connectors of adjacent barricades 100 are coupled and an automatic charging operation is performed.

The driving wheel controller 151 configured in each of the barricades 100 controls the plurality of driving wheels 152, 153, and 154 to move by controlling power input to the steering motor and driving motor of each of the driving wheels 152, 153, and 154 in response to a steering control signal and speed control signal input to each of the driving wheels 152, 153, and 154.

The sensing module 140 is configured to include a plurality of sensors for detecting the human body or an obstacle, such as at least one infrared sensor or lidar and an AD converter for converting analog detection signals into digital signals and outputting the digital signals.

The sensing module 140 supports the driving wheel module 150 to perform a driving or stop operation by detecting the human body or an obstacle while the main body of the barricade 100 moves based on the release/fastening location of the electromagnet belt and moving path information.

Furthermore, the sensing module 140 may detect awaiters adjacent to a waiting line and a change in the surrounding condition in real time while a waiting guide line is formed, and may transmit detected information to the control server 300 and a nearby guide robot 200.

While the waiting guide line is formed, the display module 130 receives, from the control server 300, waiting time information and congestion information based on the awaiter detection information and surrounding condition change information. Furthermore, the display module 130 may display the waiting time information and the congestion information on an image display panel or output them through a speaker.

FIG. 5 is a detailed block diagram illustrating the control server of FIG. 1.

The control server 300 of FIG. 5 includes a monitor display unit 311, a second communication unit 312, an application program support unit 313, an arrangement design support unit 314, an arrangement area setting unit 315, a congestion computation unit 316, a location information setting unit 317 and a waiting time computation unit 318.

Specifically, the location information setting unit 317 divides the plurality of belt type barricades 100 into the groups 100*a* and 100*b*, and stores and updates unique information and current location coordinates of the belt type barricades 100 of the groups 100*a* and 100*b* in real time by matching them. The unique information and current location coordinates of the belt type barricades 100 of the groups 100a and 100b that are stored and updated in real time are shared with the arrangement design support unit 314. As described above, the location information setting unit 317 supports the plurality of belt type barricades 100 to be divided into the groups 100a and 100b and to be disposed in preset areas as the groups 100a and 100b.

The application program support unit 313 supports an application program so that an arrangement structure for the belt type barricades 100 of each of the groups 100a and 100b belonging to each arrangement area is displayed on an application program screen. The application program support unit 313 supports an administrator to design or change the arrangement structure of the belt type barricades 100 of each of the groups 100a and 100b belonging to each arrangement area using a menu bar on an application program screen.

The arrangement area setting unit 315 divides an arrangement area for the belt type barricades 100 of each of the groups 100a and 100b and sets and stores location coordinates for the boundary lines of the respective divided arrangement areas. This is for supporting the application program support unit 313 and the arrangement design support unit 314 to check an arrangement area for the belt type barricades 100 of each of the groups 100a and 100b in real time and set or change arrangement structure design information for the barricades 100 of each of the groups 100a and 100b based on each arrangement area.

The arrangement design support unit 314 sets or changes arrangement structure design information for the belt type barricades 100 of each of the groups 100a and 100b based on awaiter detection information and surrounding condition change information received from the belt type barricades 100 of each of the groups 100a and 100b through the second communication unit 312. Furthermore, when arrangement structure design information for the belt type barricades 100 of each of the groups 100a and 100b is set or updated, the arrangement design support unit 314 transmits the arrangement structure design information to the belt type barricades 100 of each of the groups 100a and 100b so as to support the belt type barricades 100 of each of the groups 100a and 100b to perform automatic belt fastening and autonomous driving.

FIG. 6 is a diagram illustrating the formation of a guide line and arrangement structure for belt type barricades according to an embodiment.

Referring to FIG. 6, the arrangement design support unit 314 of the control server 300 sets initial arrangement structure design information for the initial arrangement of the belt type barricades 100 of each of the groups 100a and 100b disposed in respective preset areas. Furthermore, the arrangement design support unit 314 may control the belt type barricades 100 of each of the groups 100a and 100b based on the initial arrangement structure design information to perform automatic belt fastening and autonomous driving. When the initial arrangement of the belt type barricades 100 is performed, the belt type barricades 100 may not have formed a waiting line. Accordingly, an initial arrangement structure may be designed to divide only a waiting area and to display a boundary between the waiting areas.

When the initial arrangement structure design information is received, the plurality of belt type barricades 100 divided into the groups 100a and 100b performs an electromagnet belt fastening function so that the belts of adjacent barricades 100 are automatically fastened. Furthermore, in the state in which the belts have been fastened, the belt type barricades 100 may autonomously travel and move to a location on assigned coordinates within a preset arrangement area based on the initial arrangement structure design information, and may set and display a boundary between waiting areas. Furthermore, in the state in which the boundary between the waiting areas has been set, each of the belt type barricades 100 detects adjacent awaiters and a change in the surrounding condition in real time, and transmits detected information to the control server 300 and a nearby guide robot 200.

FIG. 7 is a diagram illustrating a guide line change design and change structure for the belt type barricades of FIG. 6.

Referring to FIG. 7, the arrangement design support unit 314 of the control server 300 may change arrangement structure design information based on awaiter detection information and surrounding condition change information, and may transmit the changed arrangement structure design information to the belt type barricades 100 of each of the groups 100a and 100b. If the number of awaiters increases, a waiting line needs to be set and formed. Accordingly, the arrangement design support unit 314 changes arrangement structure design information so that a waiting line is formed. In this case, the arrangement structure design information may be preset based on the number of awaiters.

When arrangement structure design information is received again, the plurality of belt type barricades 100 divided into the groups 100a and 100b automatically releases or fastens their belts between the barricades 100 based on the changed arrangement structure design information. Furthermore, the belt type barricades 100 may autonomously travel and move to a location on changed coordinates and change the existing waiting guide line. Likewise, in the state in which a boundary between the waiting areas has been set, each of the belt type barricades 100 detects adjacent awaiters and a change in the surrounding condition in real time, and transmits detected information to the control server 300 and a nearby guide robot 200.

FIG. 8 is another diagram illustrating a guide line change design and change structure for the belt type barricades of FIG. 6.

Referring to FIG. 8, the arrangement design support unit 314 of the control server 300 may additionally change arrangement structure design information based on awaiter detection information and surrounding condition change information, and may transmit the changed arrangement structure design information to the belt type barricades 100 of each of the groups 100a and 100b.

If the number of awaiters continues to increase, a waiting line needs to be set and formed more complicatedly. The arrangement design support unit 314 changes arrangement structure design information so that a waiting line is formed more complicatedly, for example, in zigzags. In this case, the arrangement structure design information may be preset based on the number of the number of awaiters.

Accordingly, when arrangement structure design information is changed and received again, the plurality of belt type barricades 100 divided into the groups 100a and 100b automatically releases or fastens their belts between the barricades 100 based on the changed arrangement structure design information. Furthermore, the belt type barricades 100 may autonomously travel and move to a location on changed coordinates in order to change the existing waiting guide line. Likewise, in the state in which a boundary between the waiting areas has been set, each of the belt type barricades 100 detects adjacent awaiters and a change in the surrounding condition in real time and transmits detected information to the control server 300 and a nearby guide robot 200.

The congestion computation unit 316 of the control server 300 computes congestion for each arrangement area based on awaiter detection information and surrounding condition change information received from the belt type barricades 100 of each of the groups 100a and 100b through the second communication unit 312. In this case, the computed congestion information is shared with the guide robot 200.

The congestion computation unit 316 may compute the congestion in real time using Equation 1.

Congestion ($j$(%))=the current number of awaiters ($w$)/maximum accommodation persons ($c$)×100 [Equation 1]

Maximum accommodation persons ($c$)=length of belt drawn from each barricade×width between barricades 100 of each of the groups 100a and 100b Furthermore, the waiting time computation unit 318 of the control server 300 computes a waiting time for each arrangement area based on awaiter detection information and surrounding condition change information received from the belt type barricades 100 of each of the groups 100a and 100b, and shares waiting time information with the guide robot 200 and the belt type barricades 100 of each of the groups 100a and 100b.

The waiting time may be computed based on the distance of a waiting line based on a processing speed by computing the distance of the waiting line, that is, the processing speed at which the waiting line is reduced from the waiting length of the number of awaiters who await in the belt type barricades 100 of each of the groups 100a and 100b that form the waiting line.

FIG. 9 is a diagram illustrating the information notification function of the guide robot based on wireless communication between the control server and the guide robot of FIG. 1.

Referring to FIG. 9, the guide robot 200 performs short distance/remote wireless communication with the barricades 100 of each of the groups 100a and 100b and the control server 300 through wireless Internet.

The guide robot 200 receives waiting time information and congestion information based on awaiter detection information and surrounding condition change information from the congestion computation unit 316 and the waiting time computation unit 318 of the control server 300. Furthermore, the guide robot 200 generates waiting line change guide information based on the waiting time information and congestion information, and displays the generated waiting line change guide information on an image display panel or outputs it through a speaker.

Furthermore, the guide robot 200 may receive guide information, such as event information or life information, from the control server 300 in real time in addition to the waiting line change guide information, and may display the guide information in an image form or output it through a speaker.

As described above, the belt type barricade 100 according to an embodiment autonomously performs functions, such as a movement for forming a waiting guide line, a movement for automatic charging, belt fastening, awaiter sensing, waiting information indication, and wireless communication. Accordingly, there can be provided an effect in that the time required and manpower for constructing a waiting line can be reduced.

Furthermore, the automatic control system for belt type barricades according to an embodiment can improve management and operation efficiency for belt type barricades by automatically setting and changing an awaiter guide line and remotely controlling the barricade units based on the set guide line.

Furthermore, the automatic control system for a belt type barricade according to an embodiment can improve use satisfaction and reliability of awaiters and administrators by supporting visitors or awaiters to check waiting time information, congestion information, waiting line change guide information, event information, or life information in real time.

The present disclosure described above may be substituted, modified and changed in various ways by a person having ordinary skill in the art to which the present disclosure pertains without departing from the technical spirit of the present disclosure, and thus is not restricted by the above-described embodiments and the accompanying drawings.

The invention claimed is:

1. A belt type barricade comprising:
   a belt roll module configured to have an electromagnet belt automatically fastened to or detached from an adjacent barricade;
   a driving wheel module configured to support autonomous driving and movement by controlling a plurality of driving wheels; and
   a barricade control module configured to control the fastening and detachment operation of the electromagnet belt of the belt roll module and driving of the driving wheel module based on arrangement structure design information or waiting mode switching information that is received in real time.

2. The belt type barricade according to claim 1, wherein the belt roll module comprises:
   a belt receiving unit configured to have the electromagnet belt received therein in a rolling type or drawn therefrom;
   an electromagnet driving unit configured to supply driving power to an electromagnet so that the electromagnet of a belt fastening unit generates an electromagnetic force; and
   a belt fastening controller configured to control the fastening or detachment of the electromagnet belt by controlling a driving power on/off operation of the electromagnet driving unit.

3. The belt type barricade according to claim 2, wherein the barricade control module comprises:
   a sensing module configured to detect an awaiter and a change in a surrounding condition in real time;
   a display module configured to compute waiting time information based on a result of the detection of the awaiter and display the waiting time; and
   a battery configured to supply rated power to the belt roll module, the driving wheel module, the barricade control module, the sensing module, and the display module.

4. The belt type barricade according to claim 1, wherein the driving wheel module comprises:
   the plurality of driving wheels, and
   a driving wheel controller configured to control a steering and driving of each of the plurality of driving wheels based on a steering control signal and driving control signal from the barricade control module.

5. The belt type barricade according to claim 1, wherein the barricade control module comprises:

a location information confirmation unit configured to compute location information comprising location coordinates in real time;

a map information confirmation unit configured to generate map structure information by comparing current location coordinates with arrangement location coordinates included in arrangement structure design information received from a control server through a first communication unit; and a control signal generator configured to set a moving path and control the driving wheel module and the belt roll module based on a result of the comparison between the current location coordinates and the arrangement location coordinates included in the arrangement structure design information.

6. The belt type barricade according to claim 5, wherein:

the barricade control module further comprises a unique information transmitter configured to read unique information comprising its own ID and serial number stored in a unique information recognition unit and to support a transmission of the unique information when current location information comprising the current location coordinates is transmitted, and the first communication unit transmits the current location information to the control server along with the unique information and transmits the arrangement structure design information, received from the control server, to the map information confirmation unit and the control signal generator.

7. The belt type barricade according to claim 5, wherein when arrangement structure design information is received or received again from the control server, the map information confirmation unit extracts arrangement location coordinates for each piece of unique information included in the arrangement structure design information, calculates arrangement location coordinates coincident with its own unique information, and updates map information by matching its own current location coordinates with arrangement location coordinates coincident with its own unique information on the map information.

8. The belt type barricade according to claim 7, wherein the control signal generator receives and confirms the map information having matched location coordinates through the map information confirmation unit in real time, compares its own current location coordinates with the arrangement location coordinates of the arrangement structure design information, and sets release or fastening location information and moving path information of the electromagnet belt based on a result of the comparison between the location coordinates.

9. An automatic control system for a belt type barricade, comprising:

a plurality of belt type barricades configured to form a waiting guide line by performing autonomous driving, automatic belt fastening, awaiter sensing, waiting information indication, and wireless communication functions or to perform an autonomous driving and moving function for automatic charging;

a control server configured to divide the plurality of belt type barricades into groups and to control automatic belt fastening, autonomous driving, automatic arrangement and automatic charging operations of the belt type barricades of each group so that the belt type barricades form a waiting guide line in each preset area; and a guide robot configured to display at least one piece of guide information of waiting time information, congestion information, waiting line change guide information, event information, and life information in real time.

10. The automatic control system according to claim 9, wherein each of the belt type barricades comprises:

a belt roll module configured to have an electromagnet belt automatically fastened to or detached from an adjacent barricade;

a driving wheel module configured to support autonomous driving and movement by controlling a plurality of driving wheels; and a barricade control module configured to control the fastening and detachment operation of the electromagnet belt of the belt roll module and driving of the driving wheel module based on arrangement structure design information or waiting mode switching information that is received in real time.

11. The automatic control system according to claim 9, wherein the belt roll module comprises:

a belt receiving unit configured to have the electromagnet belt received therein in a rolling type or drawn therefrom;

an electromagnet driving unit configured to supply driving power to an electromagnet so that the electromagnet of a belt fastening unit generates an electromagnetic force; and a belt fastening controller configured to control the fastening or detachment of the electromagnet belt by controlling a driving power on/off operation of the electromagnet driving unit.

12. The automatic control system according to claim 10, wherein the barricade control module comprises:

a sensing module configured to detect an awaiter and a change in a surrounding condition in real time;

a display module configured to compute waiting time information based on a result of the detection of the awaiter and display the waiting time; and a battery configured to supply rated power to the belt roll module, the driving wheel module, the barricade control module, the sensing module, and the display module.

13. The automatic control system according to claim 9, wherein the driving wheel module comprises:

the plurality of driving wheels, and a driving wheel controller configured to control a steering and driving of each of the plurality of driving wheels based on a steering control signal and driving control signal from the barricade control module.

14. The automatic control system according to claim 9, wherein the barricade control module comprises:

a location information confirmation unit configured to compute location information comprising location coordinates in real time;

a map information confirmation unit configured to generate map structure information by comparing current location coordinates with arrangement location coordinates included in arrangement structure design information received from a control server through a first communication unit; and a control signal generator configured to set a moving path and control the driving wheel module and the belt roll module based on a result of the comparison between the current location coordinates and the arrangement location coordinates included in the arrangement structure design information.

15. The automatic control system according to claim 14, wherein:

the barricade control module further comprises a unique information transmitter configured to read unique information comprising its own ID and serial number stored in a unique information recognition unit and to support a transmission of the unique information when current location information comprising the current location coordinates is transmitted, and the first communication unit transmits the current location information to the control server along with the unique information and transmits the arrangement structure design information, received from the control server, to the map information confirmation unit and the control signal generator.

16. The automatic control system according to claim 14, wherein when arrangement structure design information is received or received again from the control server, the map information confirmation unit extracts arrangement location coordinates for each piece of unique information included in the arrangement structure design information, calculates arrangement location coordinates coincident with its own unique information, and updates map information by matching its own current location coordinates up with arrangement location coordinates coincident with its own unique information on the map information.

17. The automatic control system according to claim 14, wherein the control signal generator receives and confirms the map information having matched location coordinates through the map information confirmation unit in real time, compares its own current location coordinates with the arrangement location coordinates of the arrangement structure design information, and sets release or fastening location information and moving path information of the electromagnet belt based on a result of the comparison between the location coordinates.

18. The automatic control system according to claim 9, wherein the control server comprises:

a location information setting unit configured to divide the plurality of belt type barricades into groups and to store and update unique information and current location coordinates of the belt type barricades of each group in real time by matching the unique information and current location coordinates;

an application program support unit configured to support a design or change of an arrangement structure for the belt type barricades of each group belonging to each arrangement area using an application program displayed on a monitor display unit;

an arrangement area setting unit configured to divide an arrangement area for the belt type barricades of each group and to set and store location coordinates for boundary lines of the divided arrangement areas; and an arrangement design support unit configured to set or change arrangement structure design information for the belt type barricades of each group based on awaiter detection information and surrounding condition change information received from the belt type barricades of each group through a second communication unit.

19. The automatic control system according to claim 18, wherein the control server further comprises:

a congestion computation unit configured to compute congestion of each arrangement area based on the awaiter detection information and surrounding condition change information received from the belt type barricades of each group through the second communication unit and to share the computed congestion information with the guide robot; and a waiting time computation unit configured to compute a waiting time of each arrangement area based on the awaiter detection information and surrounding condition change information received from the belt type barricades of each group and to share the waiting time information with the guide robot and each of the belt type barricades.

* * * * *